United States Patent [19]
Urahashi

[11] Patent Number: 6,009,374
[45] Date of Patent: Dec. 28, 1999

[54] APPARATUS FOR AND METHOD OF CONTROLLING VEHICULAR SYSTEMS WHILE TRAVELLING

[75] Inventor: Kazuyoshi Urahashi, Tokyo, Japan

[73] Assignee: Mitsubishi Denki Kabushiki Kaisha, Tokyo, Japan

[21] Appl. No.: 08/730,669

[22] Filed: Oct. 11, 1996

[30] Foreign Application Priority Data

Oct. 24, 1995 [JP] Japan .................................. 7-275637

[51] Int. Cl.⁶ ................................................. G06F 165/00
[52] U.S. Cl. ........................ 701/209; 701/200; 701/208; 340/988
[58] Field of Search .................................. 701/26, 36, 37, 701/38, 41, 48, 51, 54, 65, 70, 72, 103, 200, 208, 209, 220, 221; 340/990, 988, 995

[56] References Cited

U.S. PATENT DOCUMENTS

| | | | |
|---|---|---|---|
| 4,635,202 | 1/1987 | Tsujii et al. | 364/449 |
| 5,177,685 | 1/1993 | Davis et al. | 364/443 |
| 5,247,440 | 9/1993 | Capurka et al. | 364/424.05 |
| 5,508,931 | 4/1996 | Snider | 364/449 |
| 5,661,650 | 8/1997 | Sekine et al. | 364/424.027 |
| 5,684,699 | 11/1997 | Sugiyama | 364/424.051 |
| 5,737,225 | 4/1998 | Schulte | 364/449.5 |
| 5,748,476 | 5/1998 | Sekine et al. | 364/449 |
| 5,757,289 | 5/1998 | Nimura et al. | 340/995 |
| 5,790,975 | 8/1998 | Kashiwazaki et al. | 701/208 |
| 5,832,400 | 11/1998 | Takahashi et al. | 701/53 |

FOREIGN PATENT DOCUMENTS

| | | |
|---|---|---|
| 59-200845 | 11/1984 | Japan . |
| 59-200846 | 11/1984 | Japan . |
| 59-200847 | 11/1984 | Japan . |
| 63-172397 | 7/1988 | Japan . |
| 4-201712 | 7/1992 | Japan . |
| 6-290396 | 4/1993 | Japan .......................... G08G 1/0969 |
| 6-187595 | 7/1994 | Japan . |

Primary Examiner—William A. Cuchlinski, Jr.
Assistant Examiner—Arthur D. Donnelly
Attorney, Agent, or Firm—Burns, Doane, Swecker & Mathis, LLP

[57] ABSTRACT

A vehicle-mounted travel control system including a navigation system control section which controls a storage section, a position detection section for detecting the present position of the vehicle, a course decision section for deciding an intended travel course of the vehicle. The travel control system also includes a central control section for managing control sections based on information of various sensors installed in the vehicle. The system also includes a terminal device which is connected to the navigation system control section and the central control section. The terminal device is adapted to determine at least one predetermined time responsive to an actual vehicle speed based on actual vehicle speed information transferred from said central control section, and the navigation system control section is adapted to determine an intended travel position after elapse of a predetermined time with reference to the present position of the vehicle based on the vehicle speed and predetermined time transferred from the terminal device.

18 Claims, 12 Drawing Sheets

| LONGITUDE | LATITUDE | ALTITUDE | ATTRIBUTE |
|---|---|---|---|
| ⋮ | ⋮ | ⋮ | ⋮ |
| Long. 139° 45 E | Lat. 35° 40 N | 10 m | ORDINARY ROAD |
| Long. 139° 50 E | Lat. 35° 50 N | 20 m | ORDINARY ROAD & RAILROAD CROSSING |
| ⋮ | ⋮ | ⋮ | ⋮ |
| Long. 140° 00 E | Lat. 37° 30 N | 1000 m | HIGHWAY |
| Long. 140° 05 E | Lat. 37° 30 N | 1000 m | HIGHWAY & TUNNEL |
| ⋮ | ⋮ | ⋮ | ⋮ |

APPARATUS FOR AND METHOD OF CONTROLLING VEHICULAR SYSTEMS WHILE TRAVELLING

FIELD OF THE INVENTION

The present invention relates to a vehicle-mounted travel control system, and more particularly, to a vehicle-mounted travel control system which is applicable to controlling a vehicle by the use of a navigation system, and especially, which can predictively provide optimal control of the vehicle responsive to determination of an intended future travel position.

BACKGROUND OF THE INVENTION

In the field of vehicle mounted travel control systems, many type of navigation systems have been proposed in the past. FIG. 13 is a block diagram showing a conventional vehicle mounted travel controlling system.

Referring to FIG. 13, a central control section 101 synthetically processes information from control sections such as an engine control section 102 for controlling an engine of a vehicle and a transmission control section 103 for controlling a transmission. In this context, "synthetically" means that the control is comprehensive, that is, that the central control section 101 controls virtually all control sections. Also, a navigation system control section 104 controls navigation of the vehicle and a storage section 105 stores map information. A course decision section 106 processes information about a destination of the vehicle and a designated course to determine the future course of the vehicle, a position detection section 107 measures the present position of the vehicle using signals from a sensor or an artificial satellite, a display section 108 displays the map information, the present position of the vehicle and the future course of the vehicle, and a voice message notification section 109 provides voice messages. Generally, an automobile includes, as shown in FIG. 13, the engine control section 102 for processing information from various sensors and the transmission control section 103, and controls the engine, transmission, suspension, steering system, air conditioning system and lighting device, etc., under the control of the control sections.

The conventional navigation system can designate a starting point, a destination of the vehicle and a designated course based on the results of processing by the course decision section 106 and the position detection section 107. A scheduled course of the vehicle is calculated by the course decision section 106 in combination of the map information previously stored in the storage section, and as a consequence, the present position of the vehicle and a direction of travel at an intersection and the like are displayed on the display section 108 or provided by voice with the voice message notification section 109, whereby the vehicle can be guided.

In the above prior art, a navigation system is described which guides the vehicle by displaying or providing an audible indication of the present position of the vehicle and the direction of travel at an intersection and the like. However, other conventional navigation systems include those which can calculate a distance and a required time between the present position of the vehicle and an intersection and the like where the direction is changed, and can inform the driver of the change by voice or by a visual display. Prior art systems also include those which can obtain weather information and information about vacant parking lots from radio transmissions sent by a radio station and the like, and can provide this information to the driver, again either visually with a display or audibly with a voice-based system.

As prior art in which the sensors and control device of the aforementioned vehicle are used, for example, a traffic jam travel detecting apparatus is disclosed in Japanese Unexamined Patent Publication No. 63-172397. The conventional traffic jam travel detecting apparatus calculates outputs of vehicle speed sensors, judges that a traffic jam exists when the vehicle is traveling at or less than a predetermined speed based on the calculation results of the calculated output of the vehicle sensors, and controls a vehicle height adjusting device, suspension, automatic transmission, and engine based on the result thereof.

In addition, other conventional traffic jam detecting apparatuses, which detect a traffic jam by using the outputs of the vehicle speed sensors, are disclosed in Japanese Unexamined Patent Publication Nos. 59-200845, 59-200846, and 59-200847.

Further, an apparatus for controlling the shifting of an automatic transmission based upon the number of revolutions of the engine and vehicle speed, an apparatus for controlling a vehicle suspension from a rotation angle of the steering wheel and a vehicle speed, an apparatus for controlling a gear change-up timing or gear change-down timing with the back-and-forth inclination of a traveling vehicle, an apparatus for controlling a lighting device in accordance with surrounding brightness, and an apparatus for controlling a vehicle height in accordance with a vehicle speed are all known.

A system in which a vehicle is controlled on the basis of information from a navigation system is also known. For example, a vehicle air conditioning apparatus is disclosed in Japanese Unexamined Patent Publication No. 4-201712, and a hybrid-type vehicle is disclosed in Japanese Unexamined Patent Publication No. 6-187595.

The former vehicle air conditioning apparatus controls an air conditioning device of the vehicle by the map information of the navigation system and travel information in such a manner that an air conditioner is automatically switched from external air inlet to internal air circulation when going into a tunnel, and controls an air conditioning device of the vehicle in a traffic jam by judging the traffic jam environment with a distance traveled per hour. The latter hybrid-type vehicle increases accuracy of information for guiding the vehicle by adding information about the road on which the vehicle is traveling to the map information of the navigation system, and switches a drive force (specifically, an engine and a motor) responsive to the travel position by adapting the vehicle to the condition of different environment even at the same point, such as a multilevel intersection.

Since the conventional central control section and navigation system of the vehicle are separately and individually constructed as described above without combination, they cannot control the vehicle by mutually using the information from the sensors and the navigation system mounted on the vehicle.

In addition, although they can judge the position of the road along which the vehicle passes immediately after a present position (imaginary course), they have no means for knowing the condition of the imaginary course. Therefore, since various control operations are performed after obtaining the present information from the sensors and navigation system mounted on the vehicle, the control of the vehicle may be delayed, or the vehicle may be erroneously controlled.

Further, conventional navigation systems can virtually move the vehicle on a map when calculating the scheduled course. However, this is performed by using predetermined data such as a vehicle speed, and conventional navigation systems can not use the actual vehicle speed of the traveling vehicle, and further, can not predict the intended travel position after the passage of a predetermined time with reference to the present position.

SUMMARY OF THE INVENTION

The present invention has been made to overcome the problems of the conventional navigation systems described above.

An object of the invention is to provide a vehicle-mounted travel control system which can predict an intended travel position after a predetermined time with reference to the present position of the vehicle.

Another object of the invention is to provide a vehicle-mounted travel control system which can predictively control the vehicle in advance using information obtained from the navigation system before arriving at the intended travel position.

According to general aspect of the invention, a vehicle-mounted travel controlling system comprises a navigation system control section which controls a storage section, a position detection section for detecting the present position of the vehicle, a course decision section for deciding an intended travel course of the vehicle; a central control section for synthetically managing each of the control sections based on information from various control sections installed in the vehicle; and a terminal device which is connected to the navigation system control section and the central control section, and which processes information of both the navigation system control section and the central control section to transfer the information to said the navigation system control section and the central control section.

The terminal device is adapted to determine at least one predetermined time responsive to an actual vehicle speed based on actual vehicle speed information transferred from the central control section.

The navigation system control section is adapted to determine an intended travel position after the passage of a predetermined time with reference to the present position of the vehicle based on the vehicle speed and predetermined time transferred from the terminal device, and is adapted to advance the virtual position of the vehicle as stored in a memory to the determined intended travel position.

DETAILED DESCRIPTION

First Embodiment

Figure 1:
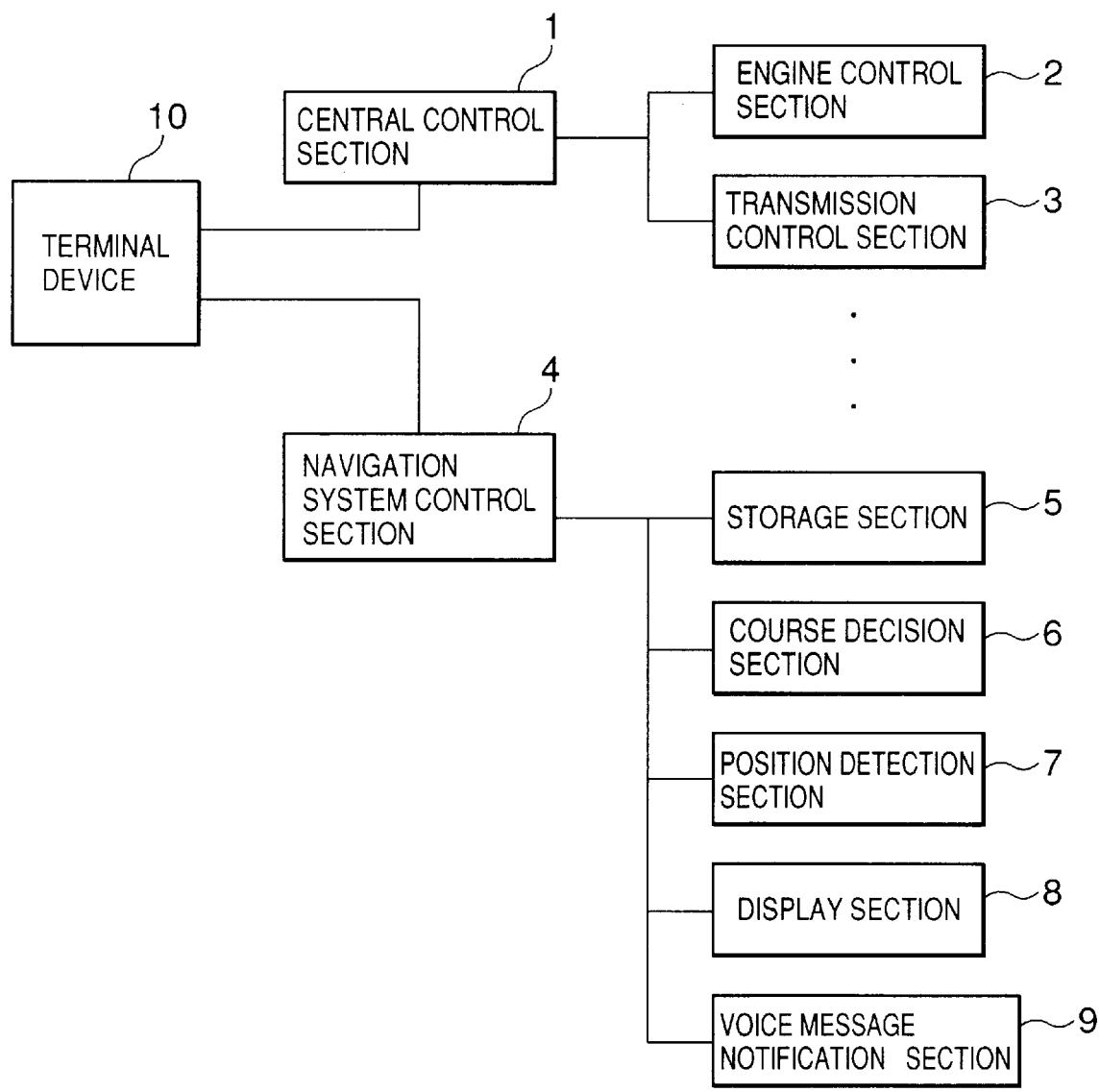
FIG. 1 is a block diagram showing a configuration of a vehicle-mounted travel control system according to a first embodiment of the present invention.

FIG. 1 is a block diagram showing a configuration of a vehicle-mounted travel control system according to a first embodiment of the present invention. Referring to FIG. 1, a central control section 1 synthetically processes information pertaining to control sections of a vehicle such as an engine control section 2 for controlling an engine of the vehicle and a transmission control section 3 for controlling a transmission of the vehicle, and others. The engine control section 2 and transmission control section 3 are typical examples of the control sections of the vehicle. A navigation system control section 4 controls navigation of the vehicle; a storage section 5 stores map information; a course decision section 6 processes information about a destination of the vehicle and a designated course of the vehicle to decide a future course of the vehicle; a position detection section 7 measures the present position of the vehicle with information from artificial satellites and sensors; a display section 8 displays map information, the present position of the vehicle, and the future course of the vehicle to provide information concerning these to the driver; a voice message notification section 9 generates a voice message to provide such information to the driver, and a terminal device 10 connects the central control section 1 and the navigation system control section 4 of the vehicle, and calculates data pertaining to both sections to transfer the data suitably to the central control section 1 and the navigation control section 4.

Figure 2:
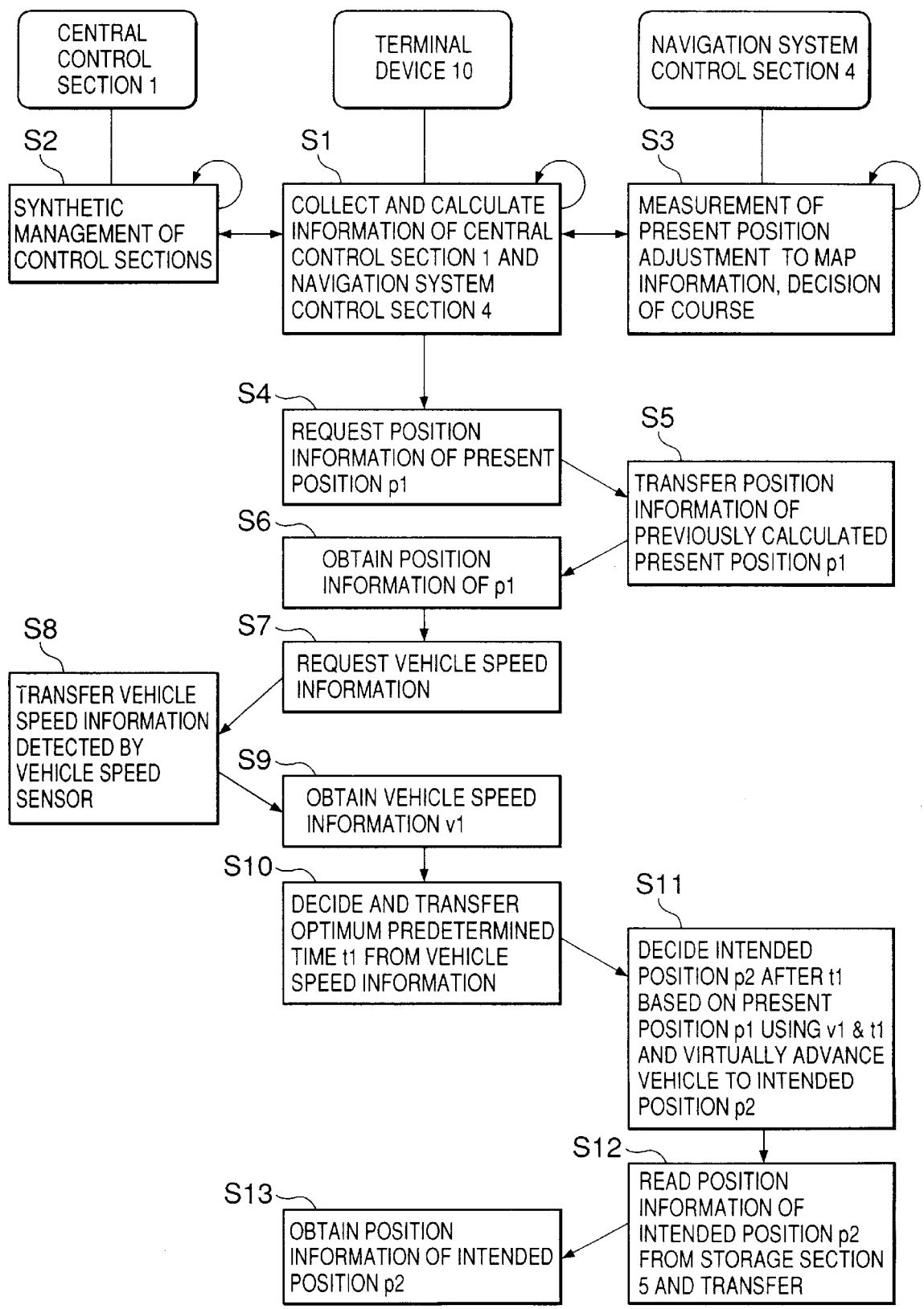
FIG. 2 is a flowchart showing the steps of procedures of the vehicle-mounted travel control system in FIG. 1.

Next, FIG. 2 is a flowchart showing the steps of procedures of the terminal device 10 shown in FIG. 1.

As described above, the terminal device 10 collects and calculates information from the central control section 1 and the navigation system control section 4 of the vehicle, and suitably transfers the results of its calculations to the central control section 1 and the navigation system control section 4 (step S1). At this time, the central control section 1 exchanges information with the terminal device 10 while synthetically managing control sections such as the engine control section 2 and the transmission control section 3 (step S2), and the navigation system control section 4 also exchanges information with the terminal device 10 (step S3). The navigation system control section 4 orders measurement of the present position of the vehicle, adjustment of the measured information of the present position of the vehicle and the map information, and decision of the optimum intended course, to each of the sections.

Figures 3, 4:
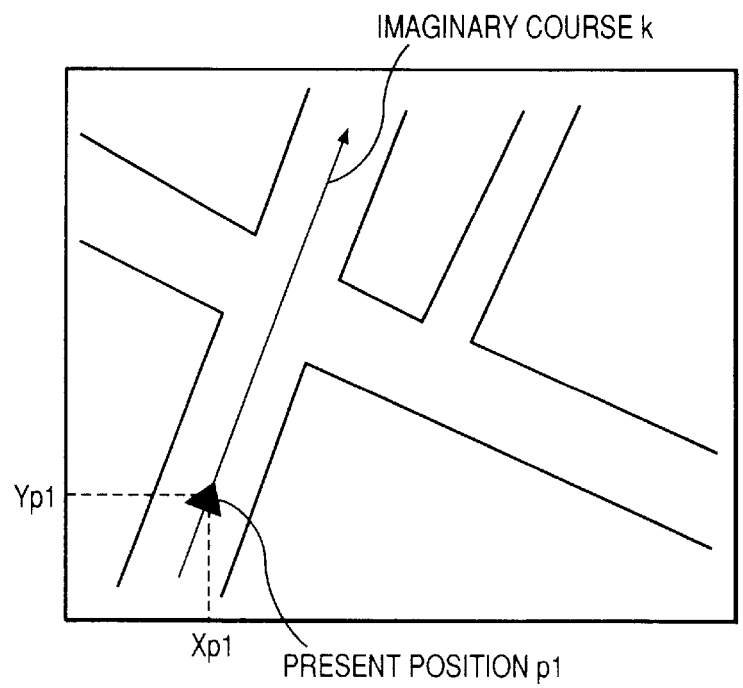
FIG. 3 illustrates an example of contents of map information and position information.
FIG. 4 illustrates a method of arranging the present position p1 on an image memory to determine coordinates.

First, the terminal device 10 requests the navigation system control section 4 to provide position information of the present position p1 of the vehicle (step S4). The navigation system control section 4, when asked for the position information of the present position p1 of the vehicle from the terminal device 10, transfers the position information of the present position p1 of the vehicle, which is previously obtained by calculation on the basis of the map information stored in the storage section 5 and the information about the present position of the vehicle detected by the position detection section 7, to the terminal device 10 (step S5). The position information of the present position p1 of the vehicle is obtained by superimposing the position information detected by the position detection section 7 onto the map information read from the storage section 5. The position information is stored in the storage section 5 after calculation thereof, and read from the storage section 5 to be transferred to the terminal device 10. The position information of the vehicle detected by the position detection section 7 is obtained from the artificial satellites and sensors. In the storage section 5, information about latitude, longitude, altitude and other attributes are stored as the position information together with the map information, as shown in FIG. 3. For example, the information about latitude, longitude, altitude and attribute are interrelated in such a manner that the storage section can indicate that the vehicle is situated at 139°45' east longitude, 35°40' north latitude, altitude of 10 m, and the attribute may be the information that the ground the vehicle is travelling over is an ordinary road. The attribute thus may include information about conditions of the road, such as an ordinary road, an ordinary road and a railroad crossing, a highway, or a highway and a tunnel.

Next, the terminal device 10, when it obtains the position information of the present position p1 of the vehicle from the navigation system control section 4 (step S6), requests the central control section 1 to provide the present vehicle speed information of the vehicle (step S7). The central control section 1, when requested to provide the vehicle speed information from the terminal device 10, transfers the present vehicle speed information detected by a vehicle speed sensor to the terminal device 10 (step S8). The terminal device 10, when it obtains the present vehicle speed information v1 from the central control section 1 (step S9), determines a suitable predetermined time t1, which is responsive to the obtained vehicle speed information v1, and transfers the obtained vehicle speed information v1 and the predetermined time t1 to the navigation system control section 4 (step S10).

The navigation system control section 4, when the vehicle speed information v1 and the predetermined time t1 from the terminal device 10 have been transferred to it, determines an intended travel position p2 after the lapse of the predetermined time t1 with the vehicle speed v1 and the predetermined time t1 based on the present position p1 read from the storage section 5, using an imaginary course processed by the course decision section 6 based on the information about the predesignated destination and course, and virtually advances the virtual position of the vehicle in memory to the determined intended travel position p2 (step S11).

Figure 5:
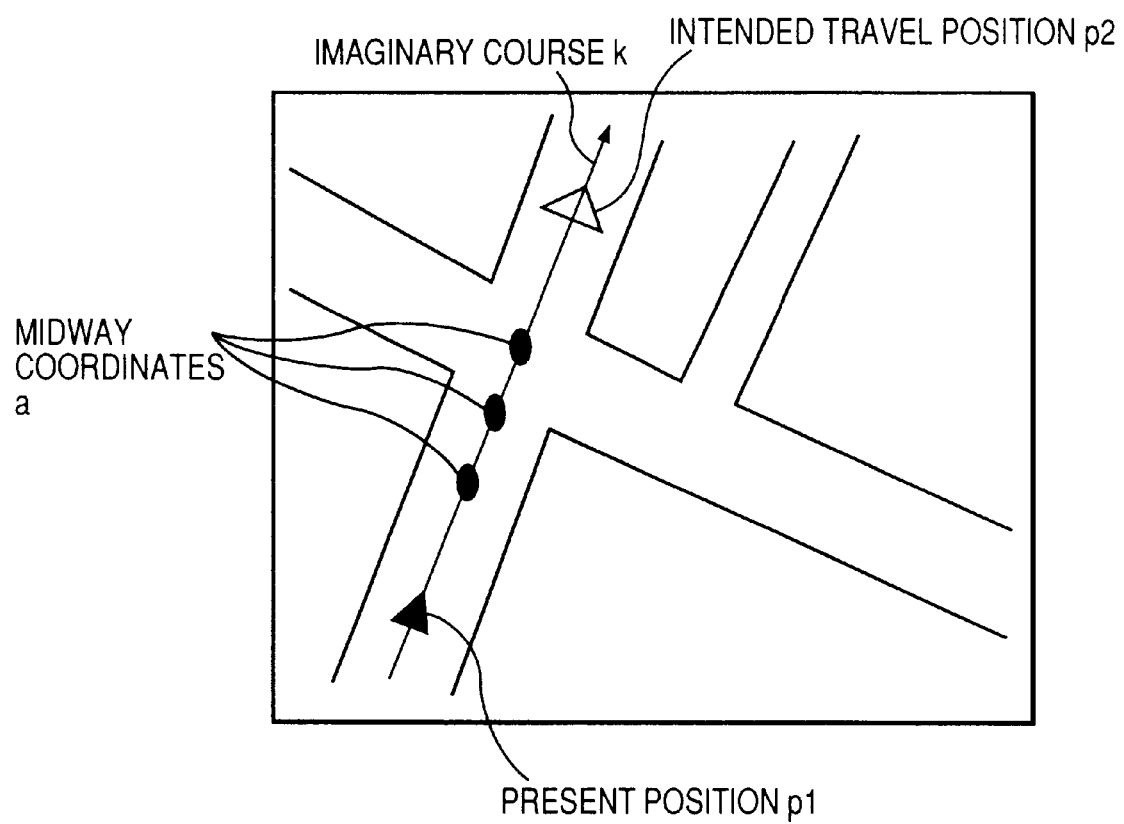
FIG. 5 illustrates a method for traveling a vehicle on an image memory from the present position p1 to the intended travel position p2 along a midway course.

This can be performed in such a manner as shown in FIG. 4. First, the map information storing therein the present position p1 of the vehicle, which is previously obtained by calculation, is read out from the storage section 5 and written in an image memory. Next, the imaginary course k processed by the course decision section 6 is superimposed onto the image memory. Then, after reading the present position p1, coordinates (Xp1, Yp1) of the present position p1 on the image memory is read. Then, as shown in FIG. 5, the coordinates are moved along the imaginary course k processed by the course decision section 6. The method of moving the coordinates along the imaginary course may include a method in which the correspondence between the coordinates which numerically express the imaginary course and the coordinates to be moved is checked, and a method in which a line showing a road of the map information is identified, and the coordinates are moved along the line.

An amount of movement at this time is determined by the scale of the map information, the vehicle speed v1 and the time t1. If the coordinates on the image memory are moved by 1 dot under the map information of the scale corresponding to 100 M such that the vehicle speed v1 is taken as 36 km/h, and the time t1 is taken as 60 seconds, the coordinates are moved by 600 m=6 dots. Coordinates p2 (Xp2, Yp2) after movement become the intended travel position, and the position of the vehicle can be virtually advanced.

As described above, according to this embodiment, the position of the vehicle is advanced in memory from the present position p1 to the intended travel position p2 along an imaginary course based on the actual vehicle speed and the predetermined time corresponding thereto. Thus, as described later in detail, the position information corresponding to the intended travel position p2 can be obtained from the storage section 5. For this reason, the vehicle can be optimally controlled in advance in response to the position information of the advanced intended travel position p2 before actually arriving at the intended travel position p2. For example, when the attribute of the road at the intended travel position p2 is an ordinary road, highway and the like, the vehicle can be predictively controlled in response thereto. The position information shown in FIG. 3 shows an example, and the position information is not limited thereto.

When the vehicle is decelerating to a stop to wait for a traffic light and the like, the vehicle speed v1 becomes "0" according to the above-described method alone, so that the intended travel position cannot be calculated. In this case, the terminal device 10, when it judges that the present vehicle speed is zero and the vehicle is stopping from the actual vehicle speed transferred from the central control section 1, may set a provisional vehicle speed v2 (for example, 30 km/h) in place of the actual vehicle speed v1, and determine the predetermined time responsive to the set provisional vehicle speed. As a result, since the intended travel position after the lapse of the predetermined time can be calculated even if the vehicle is stopping, the position of the vehicle can be advanced in memory to the intended travel position after the lapse of the predetermined time.

Then, a linear expression representing a straight line which connects the present position p1 to the intended travel position p2 of the vehicle will be formulated. Since the information about the longitude and latitude of the present position p1 of the vehicle is already known by being stored in the storage section 5 as the position information, the longitude and latitude of the intended travel position p2 can be calculated using the longitude, latitude and the above linear expression.

Figure 6:
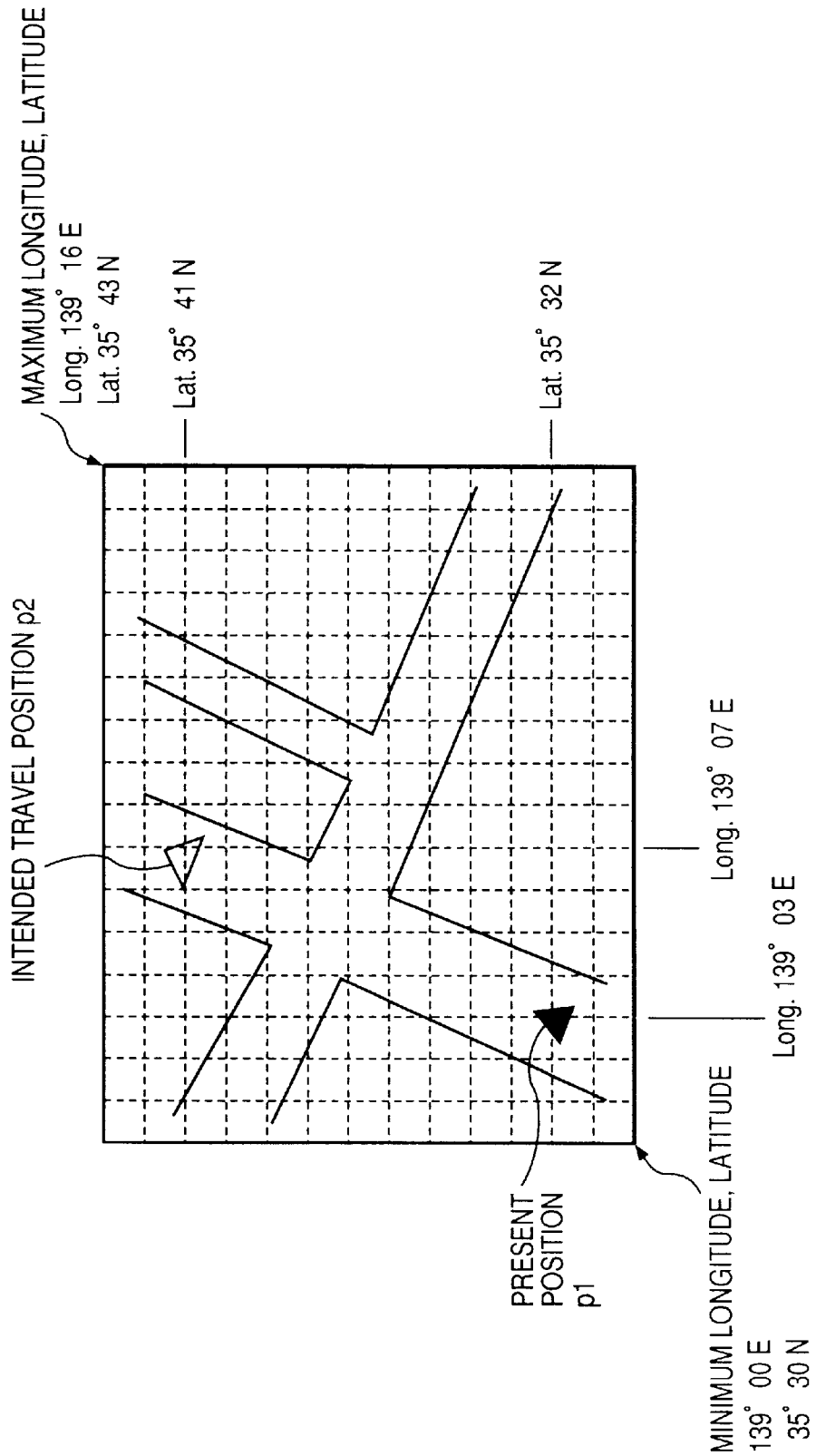
FIG. 6 illustrates a method for converting coordinates of the intended travel position p2 in the image memory into the actual longitude and latitude.

This may be also performed, for example, by the method shown in FIG. 6. When the map information is written in the image memory, it is adjusted to the maximum value and the minimum value of the longitude and latitude. The range determined thereby is divided by predetermined lines (grid), and the values of the grid crossing the intended travel position p2 are read, whereby the longitude and latitude of the intended travel position p2 can be obtained.

Then, the position information (altitude, attribute) of the intended travel position p2 corresponding to the longitude and latitude of the resulting intended travel position p2 is read out from the storage section 5 and transferred to the terminal device 10 (step S12). As shown in FIG. 3, when the longitude and latitude are determined, the altitude and attribute corresponding thereto can be obtained. As a result, the terminal device 10 can obtain the present position information and the position information after the lapse of the predetermined time t1 of the vehicle (step S13).

As described above, according to this embodiment, the position information of the vehicle, such as the altitude and attribute, corresponding to the longitude and latitude of the intended travel position can be known. Thus, the vehicle can be optimally controlled in advance in response to the position information of the intended travel position, such as the altitude and attribute, before actually going to the intended travel position. For example, since the vehicle can expect to encounter an uphill road or a downhill road based on the information about the altitude at the intended travel position, the vehicle can be predictively controlled in response thereto. In addition, when the attribute of the road at the intended travel position p2 is ordinary road, highway and the like, the vehicle can be controlled in response thereto to be in an optimal setting for such conditions prior to actually encountering them.

Next, when the position information of the intended travel position p2 is transferred from the navigation system control section 4 to the terminal device 10, coordinates a (FIG. 5) in the middle of the path from the coordinates of the present position p1 to the coordinates of the intended travel position p2 in the image memory are simultaneously transferred to the terminal device 10. Although three intermediate or midway coordinates a are illustrated in FIG. 5 for convenience, the number of the midway coordinates is not limited thereto.

Figure 7:
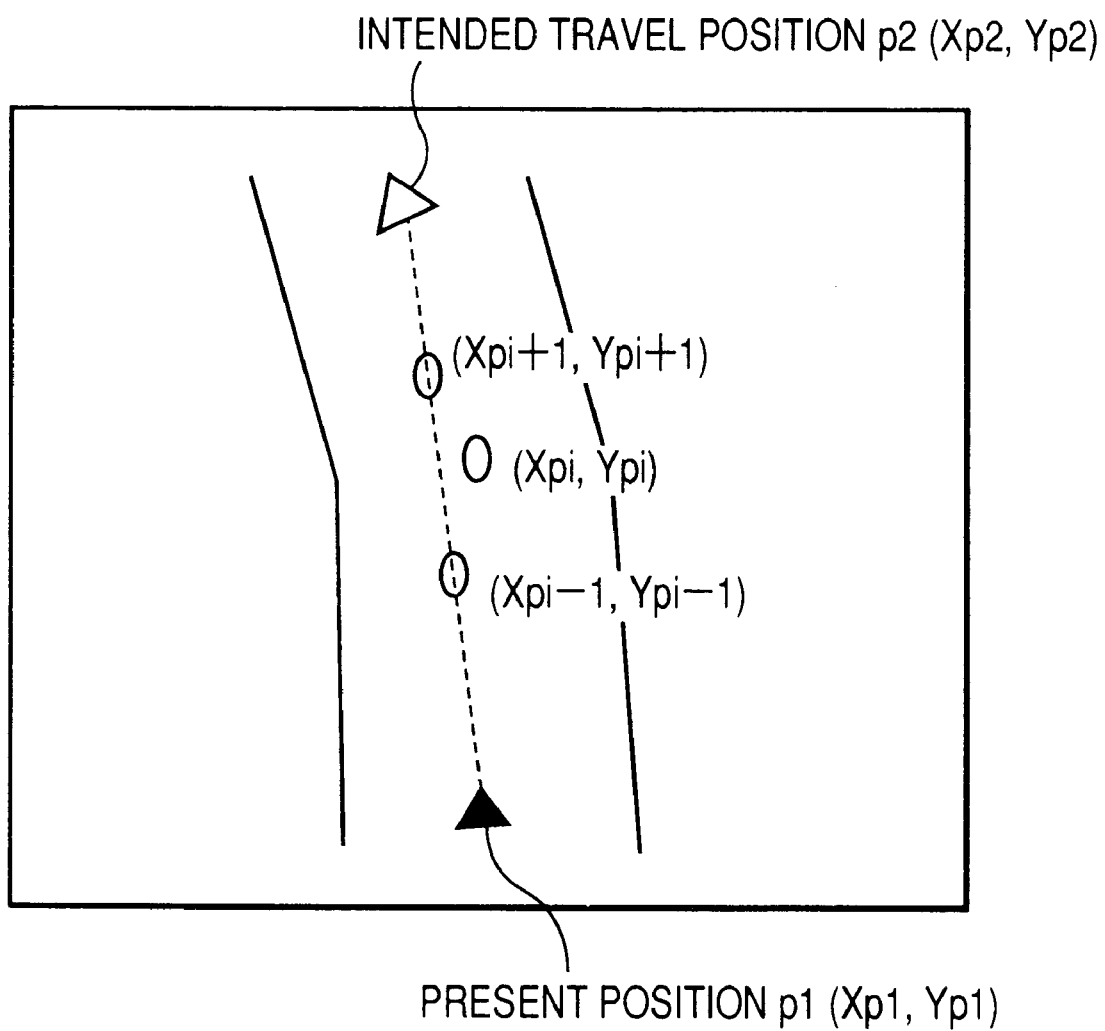
FIG. 7 illustrates a method for detecting a curvature condition between the present position p1 and the intended travel position p2.

The terminal device 10, as shown in FIG. 7, uses the midway coordinates (Xpi−1, Ypi−1)(Xpi, Ypi)(Xpi+1, Ypi+1) in the middle of moving the dot from the coordinates (Xp1, Yp1) of the present position p1 to the coordinates (Xp2, Yp2) of the intended travel position along the imaginary course so as to calculate a distance of the course and information about a curve. The former distance can be obtained by calculating the coordinate information and the scale of the map.

The latter curve is decided by, for example, as shown in FIG. 7, connecting the present position p1 and the intended travel position p2 with a straight line, and by checking whether or not the coordinates (Xpi, Ypi) are on the connected line. If the coordinates (Xpi−1, Ypi−1) immediately before the curve are on the line, and the coordinates (Xpi, Ypi) are to the right of the line, the terminal device judges that a curve exists between the coordinates (Xpi−1, Ypi−1) and the coordinates (Xpi, Ypi). In addition, if the position of the coordinates (Xpi, Ypi) greatly deviates rightward from the connected line, the terminal device judges the existence of a sharp left curve.

As described above, according to this embodiment, it is judged whether or not a curve exists on the intended travel course. When it is judged that a curve exists, the condition of the curve, such as a sharp left curve as described above, is also judged. Thus, the vehicle can be controlled, such that the speed of the vehicle is suitably reduced in advance, in accordance with the condition of the curve on the intended travel course.

In the above-described embodiment, the position detection section 7 reads out the altitude of the present position p1 from the map information of the storage section 5. However, the position detection section 7 may measure the latitude, longitude and altitude by itself by receiving signals from artificial satellites. In this case, the measurement can be performed without using the map information of the storage section 5.

In the above embodiment, a case is described where the number of the intended travel positions p2 after the lapse of the predetermined time is one. However, the present invention is not limited thereto, and the number of predetermined times may be more than one so as to increase the amount of course information. Here, the terminal device 10 determines a plurality of predetermined times responsive to the vehicle speed based on the vehicle speed information transferred from the central control section 1, and transfers them to the navigation system control section 4. The navigation system control section 4 determines a plurality of intended travel positions based on the plurality of predetermined times and the vehicle speed information to advance the position of the vehicle in memory. In this case, the vehicle can be controlled more accurately than a case where the number of the intended travel positions after elapse of the predetermined time is one.

Second Embodiment

Figure 8:
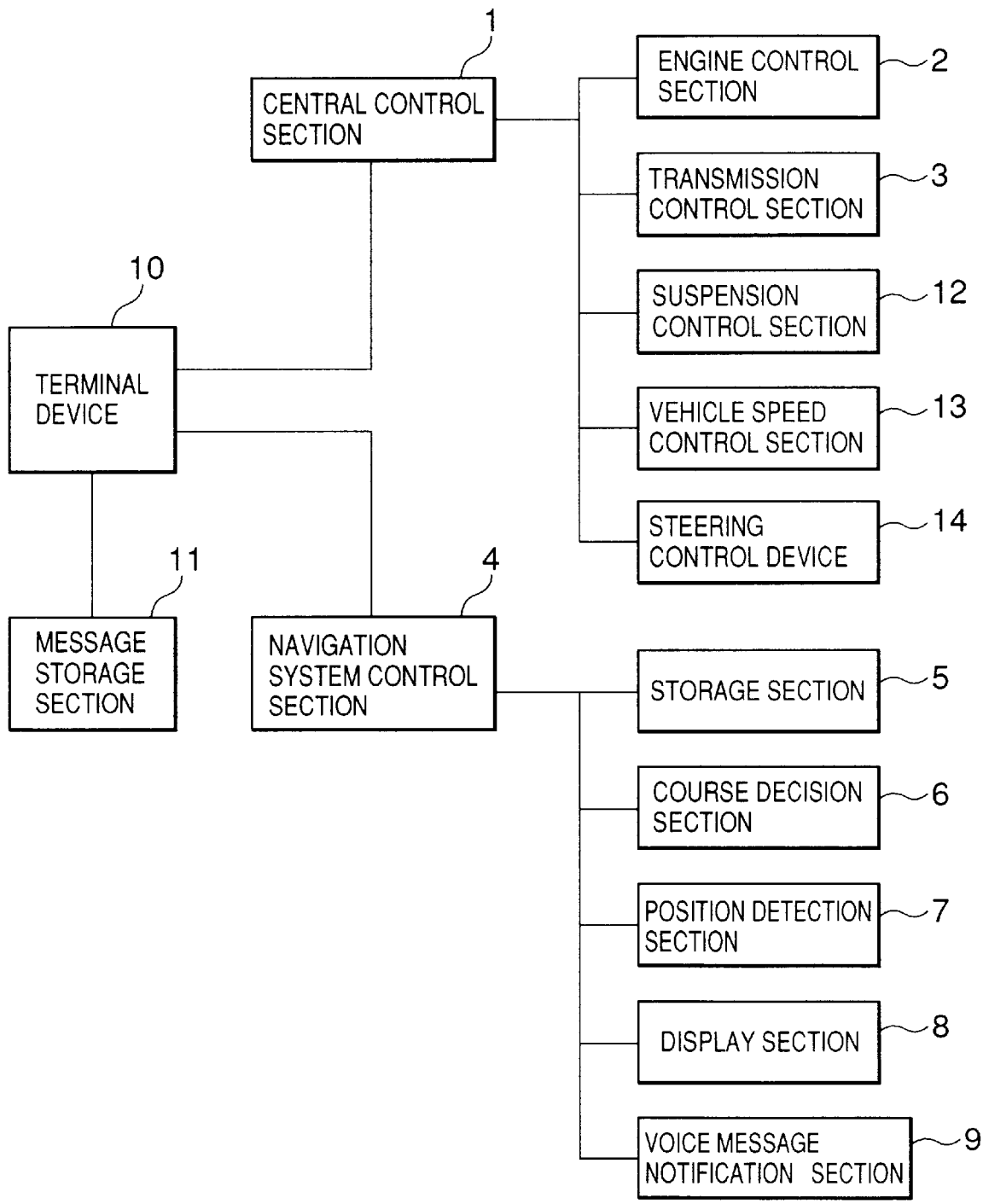
FIG. 8 is a block diagram showing a configuration of a vehicle-mounted travel control system according to a second embodiment of the present invention.

FIG. 8 is a block diagram showing a configuration of a vehicle-mounted travel controlling system according to a second embodiment of the present invention. Referring to FIG. 8, the same reference numerals as those of FIG. 1 indicate the same or equivalent portions. A message storage section 11 is connected to the terminal device 10 and stores alarm information; a suspension control section 12 controls the suspension; a vehicle speed control section 13 controls the vehicle speed; and a steering control device 14 controls a steering angle. The suspension control section 12, vehicle speed control section 13 and steering control device 14 are controlled by the central control section 1.

The terminal device 10 produces suspension-controlling information based on the actual vehicle speed v1 transferred from the central control section 1 and information about the condition of the curve obtained in the first embodiment. For example, when the vehicle goes into the curve with the present unchanged vehicle speed, and if the curve is sharper than the predetermined one, the terminal device 10 produces suspension-controlling information responsive thereto, and transfers it to the central control section 1. The central control section 1 instructs the suspension control section 12 based on the suspension-controlling information transferred from the terminal device 10 to change a damping amount of the suspension in order to maintain an attitude of the vehicle immediately before going into the curve on the intended travel course.

As described above, according to this embodiment, the suspension-controlling information is produced based on the actual vehicle speed transferred from the central control section 1 and the information about the condition of the curve on the intended travel course obtained in the first embodiment, and the suspension is controlled by the suspension control section 12 based on the produced suspension-controlling information immediately before going into the curve on the intended travel course. Thus, the optimum suspension responsive to the curve can be set immediately before going into the curve on the intended travel course. For this reason, the attitude of the vehicle can be stabilized when the vehicle goes into the curve on the intended travel course.

Similarly, the terminal device 10 produces vehicle speed-controlling information based on the actual vehicle speed v1 transferred from the central control section 1 and information about the condition of the curve obtained in the first embodiment. For example, when the vehicle goes into the curve with the present unchanged vehicle speed, and if the curve is sharper than the predetermined one, the terminal device 10 produces vehicle speed-controlling information responsive thereto, and transfers it to the central control section 1. The central control section 1 instructs the vehicle speed control section 13 based on the vehicle speed-controlling information transferred from the terminal device 10 to change the vehicle speed in order to maintain an attitude of the vehicle immediately before going into the curve on the intended travel course.

As described above, according to this embodiment, the vehicle speed-controlling information is produced based on the actual vehicle speed transferred from the central control section 1 and the information about the condition of the curve obtained in the first embodiment, and the vehicle speed is controlled by the vehicle speed control section 13 based on the produced vehicle speed-controlling information immediately before going into the curve on the intended travel course. Thus, the optimum vehicle speed responsive to the curve can be set immediately before going into the curve on the intended travel course. For this reason, the attitude of the vehicle can be stabilized when the vehicle goes into the curve on the intended travel course.

Similarly, the terminal device 10 produces steering angle-controlling information based on the actual vehicle speed v1 transferred from the central control section 1 and information about the condition of the curve obtained in the first embodiment. For example, when the vehicle goes into the curve with the present unchanged vehicle speed, and if the curve is sharper than the predetermined one, the terminal device 10 produces steering angle-controlling information responsive thereto, and transfers it to the central control section 1. The central control section 1 instructs the steering angle control section 14 based on the steering angle-controlling information transferred from the terminal device 10 to change the steering angle in order to maintain an attitude of the vehicle immediately before traveling into the curve on the intended travel course.

As described above, according to this embodiment, the steering angle-controlling information is produced based on the actual vehicle speed transferred from the central control section 1 and the information about the condition of the curve obtained in the first embodiment, and the steering angle is controlled by the steering control section 14 based on the produced steering angle-controlling information immediately before going into the curve on the intended travel course. Thus, the optimum steering angle responsive to the curve can be set immediately before going into the curve on the intended travel course. For this reason, even if a steering wheel is excessively turned or insufficiently turned by mistake when traveling into the curve on the intended travel course, the way of turning the steering wheel can be corrected.

The terminal device 10 judges whether it is dangerous to go into the curve in a state of the present speed based on the actual vehicle speed v1 transferred from the central control section 1 and the information about the condition of the curve obtained in the first embodiment. When the terminal device 10 judges it is dangerous to go into the curve on the intended travel course, the terminal device 10 reads out an image alarm information from the message storage section 11 immediately before traveling into the curve on the intended travel course and transfers it to the display section 8, and reads out a voice alarm information from the message storage section 11 to provide it to the voice message notification section 9. The display section 8 displays the image alarm information transferred from the terminal device 10 immediately before going into the curve, and informs the driver of it, and the voice message notification section 9 audibly provides the voice alarm information transferred from the terminal device 10 immediately before going into the curve. A case is herein described where the alarm information is provided to the driver by both sound (voice) and image. However, the alarm information may be notified to the driver by either voice or image.

As described above, according to this embodiment, when it is judged dangerous to go into the curve in a present state of the speed, the alarm information given by the image and voice read out from the message storage section 11 is given to the driver by the display section 8 and the voice message notification section 9 immediately before going into the curve on the intended travel course. Thus, the driver can learn it is dangerous to go into the curve with the present speed before going into the curve. Accordingly, the vehicle speed can be reduced before going into the curve.

Third Embodiment

The third embodiment will be described with reference to the vehicle-mounted travel controlling system shown in FIG. 8. The terminal device 10 compares information about the altitude from the present position information obtained in the first embodiment and the intended travel position information after the lapse of the predetermined time so as to obtain the difference in altitude between the two points, obtains the distance from the present position to the intended travel position, and calculates an average grade of the intended travel course from the obtained altitude and distance.

Next, the terminal device 10 judges a grade condition of the intended travel course based on the calculated average grade of the intended travel course, and judges whether it is suitable to travel in the present gear state of the transmission based on the judged grade state of the intended travel course and the actual value of the gear transferred from the central control section 1. When it judges the gear unsuitable, the terminal device 10 produces transmission gear-controlling information based on the actual value of the gear and the grade state of the intended travel course. When it judges the gear suitable, the vehicle travels with the gear kept unchanged. The terminal device 10, when it judges the results of the calculated grade of the intended travel course to be more of a grade than was predetermined and judges the gear unsuitable, produces gear-controlling information responsive to the grade state, and transfers it to the central control section 1.

The central control section 1 instructs the transmission control section 3 based on the gear-controlling information transferred from the terminal device 10 to control the value of the gear of the transmission immediately before going into the grade of the intended travel course. For example, when it is judged that the present gear against a future rising grade is lacking in driving force, the central control section 1 transfers the instruction for reducing the value of the gear to the transmission control section 3.

In addition, when the traveling vehicle is sequentially upshifting the gear, the central control section 1 instructs the transmission control section 3 based on the gear-controlling information transferred from the terminal device 10 to control a gear change-up timing of the transmission immediately before going into the grade of the intended travel course. For example, it is possible to control the transmission control section 3 by switching the gear change-up timing to that for an uphill road. In addition, for some values of the information for controlling the gear, it is possible not to upshift the gear even if the vehicle speed or the number of revolution of the engine reaches the predetermined value. When the grade of the intended travel course is an up grade, it is possible, for example, to travel the vehicle without changing up the gear but instead maintaining second gear.

On the other hand, the terminal device 10, when it judges the grade of the intended travel course to be more of a down grade than the predetermined one and judges the present gear unsuitable, produces gear-controlling information responsive to the grade state, and transfers it to the central control section 1. For example, if the grade of the intended travel course is a gentle down grade, the central control section 1 instructs an earlier gear change-up timing than the normal one, and instructs the transmission control section 3 to upshift the gear, and further instructs the engine control section 2 to reduce the number of revolutions.

In addition, when the grade of the intended travel course is a sharp down grade, the central control section 1 instructs the transmission control section 3 to downshift, thereby preparing for obtaining the effect of engine brake.

As described above, according to this embodiment, the difference in altitude is obtained from the altitude of the present position and the altitude of the intended travel position of the vehicle, the distance between the present position and the intended travel position is obtained, the average grade of the intended travel course is obtained based on the obtained altitude and distance, and the grade condition of the intended travel course is judged based on the obtained average grade. Thus, it can be learned whether the grade of the intended travel course is an up grade or a down grade, thereby controlling the vehicle in accordance with the grade condition.

According to this embodiment, when it judged that the traveling in the present state of the transmission is unsuitable based on the judged grade condition of the intended travel course and the actual value of the gear, transmission gear-controlling information is produced based on the grade condition of the intended travel course and the actual value of the gear, and the value of the gear and the gear change-up timing are controlled by the transmission control section 3 based on the produced gear-controlling information before moving into the grade of the intended travel course. Thus, it is possible to set the optimum value of the gear responsive to the grade of the intended travel course. For this reason, since the optimum driving force responsive to the grade can be obtained, a shortfall in driving force can be prevented at the time of the up grade, and safety can be increased by suitably applying engine braking at the time of the down grade.

Since a conventional vehicle selects the gear using information of sensors, only the optimum value at that time is obtained. For this reason, the gear is frequently controlled in accordance with situations. In contrast with this, according to this embodiment, since a future situation is predicted as well as the present optimum value to control the gear, needless control operations can be prevented, and necessary driving force and engine brake can be always obtained as described above.

In the above third embodiment, a predictive control assuming an automatic transmission is described. However, the present invention is not limited thereto. For example, in case of a vehicle having a manual transmission, the terminal device 10, when it judges the present gear unsuitable, may read out the voice message of the alarm information from the message storage section 11 and transfer it to the voice message notification section 9, and the voice message notification section 9 may produce the voice message transferred from the terminal device 10 to the driver immediately before going into a grade along the intended travel course. The alarm information includes information such that the present gear is unsuitable, and information for notifying more suitable gear than the present gear. By this, since unsuitability of the present gear and the optimum gear can be learned by the voice message immediately before going into a grade along the intended travel course, the gear can be changed to the optimum one immediately before going into the grade of the intended travel course, and then the vehicle can go into the grade.

Figure 9:
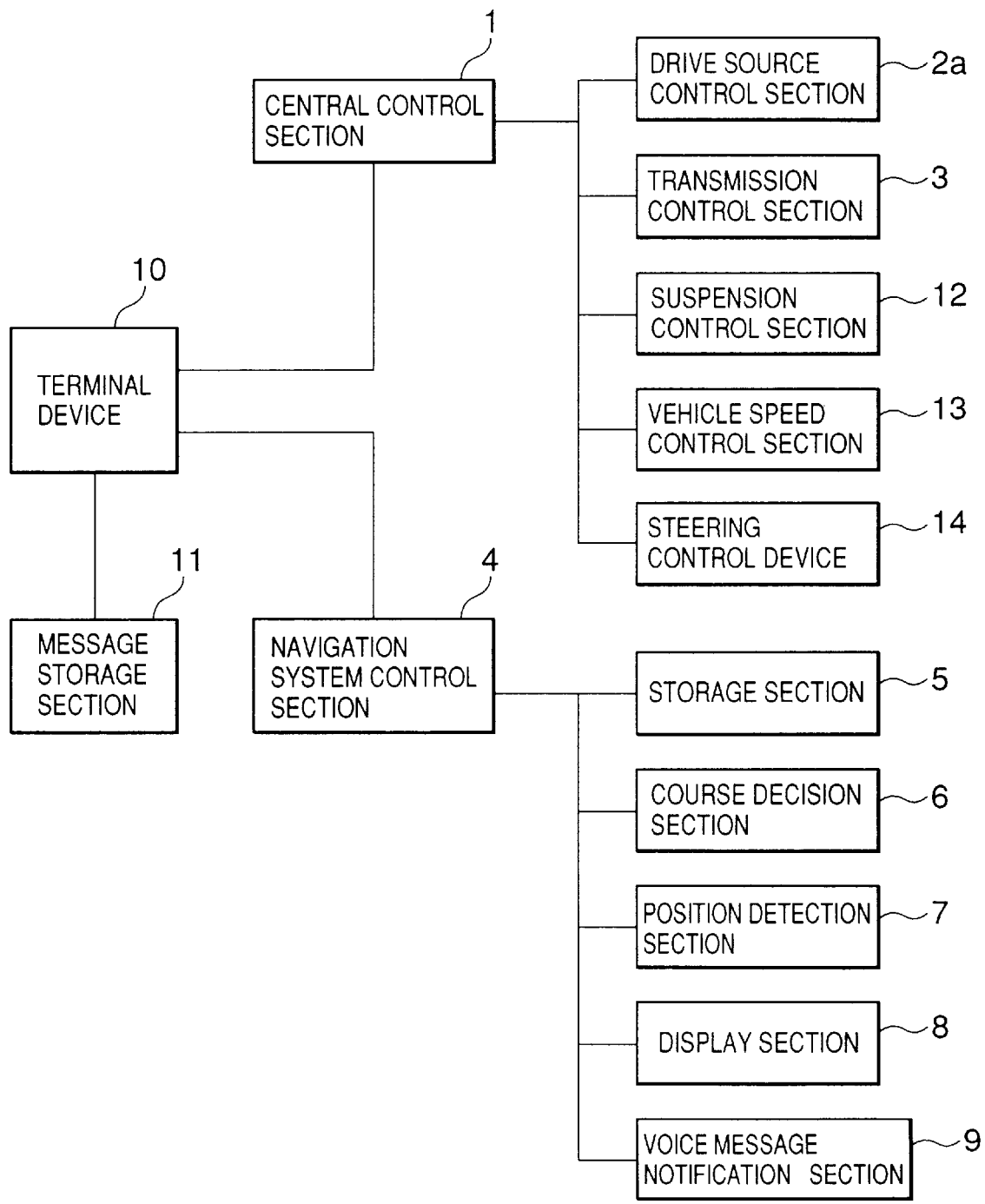
FIG. 9 is a block diagram showing a configuration of a vehicle-mounted travel control system which can be applied to the present invention.

In the above third embodiment, furthermore, control of the transmission and engine is described. However, the present invention is not limited thereto, and the control can be performed by a drive source of a hybrid-type vehicle in which the engine and an electric motor are combined. As shown in FIG. 9, when the terminal device 10 selects the drive source of the hybrid-type vehicle based on the grade condition of the intended travel course, the central control section 1 controls the drive source control section 2a to select the drive source of the hybrid-type vehicle based on the drive source information of the hybrid-type vehicle transferred from the terminal device 10 to set the drive source. The drive source control section 2a selects the engine when the up grade of the intended travel course is steep, and selects the electric motor when the grade is gentle or the down grade. This enables a suitable drive source responsive to the grade of the intended travel course to be selected.

Fourth Embodiment

This embodiment will be described with reference to the vehicle-mounted travel controlling system shown in FIG. 8. The terminal device 10 calculates a fuel mixing ratio at the present position based on the altitude information of the present position transferred from the navigation system control section 4, and judges whether or not it is necessary to change the present fuel mixing ratio calculated based the grade condition of the intended travel course which is judged as in the manner of the third embodiment. The terminal device 10, when it judges it necessary to change the present fuel mixing ratio, produces fuel mixing ratio-controlling information based on the present fuel mixing ratio and the grade state of the intended travel course. The central control section 1 instructs the engine control section 2 based on the fuel mixing ratio-controlling information transferred from the terminal device 10 to control the fuel mixing ratio before going into the grade of the intended travel course.

As described above, according to this embodiment, when it is judged necessary to change the fuel mixing ratio, fuel mixing ratio-controlling information is produced based on the present fuel mixing ratio and the grade state of the intended travel course, and the fuel mixing ratio is controlled by the engine control section 2 based on the produced fuel mixing ratio-controlling information immediately before going into the grade of the intended travel course. Thus, the optimum fuel mixing ratio can be set immediately before going into the grade of the intended travel course to control the engine. For this reason, a relative reduction in engine output at the time of traveling at higher altitudes can be prevented.

Fifth Embodiment

Figure 10:
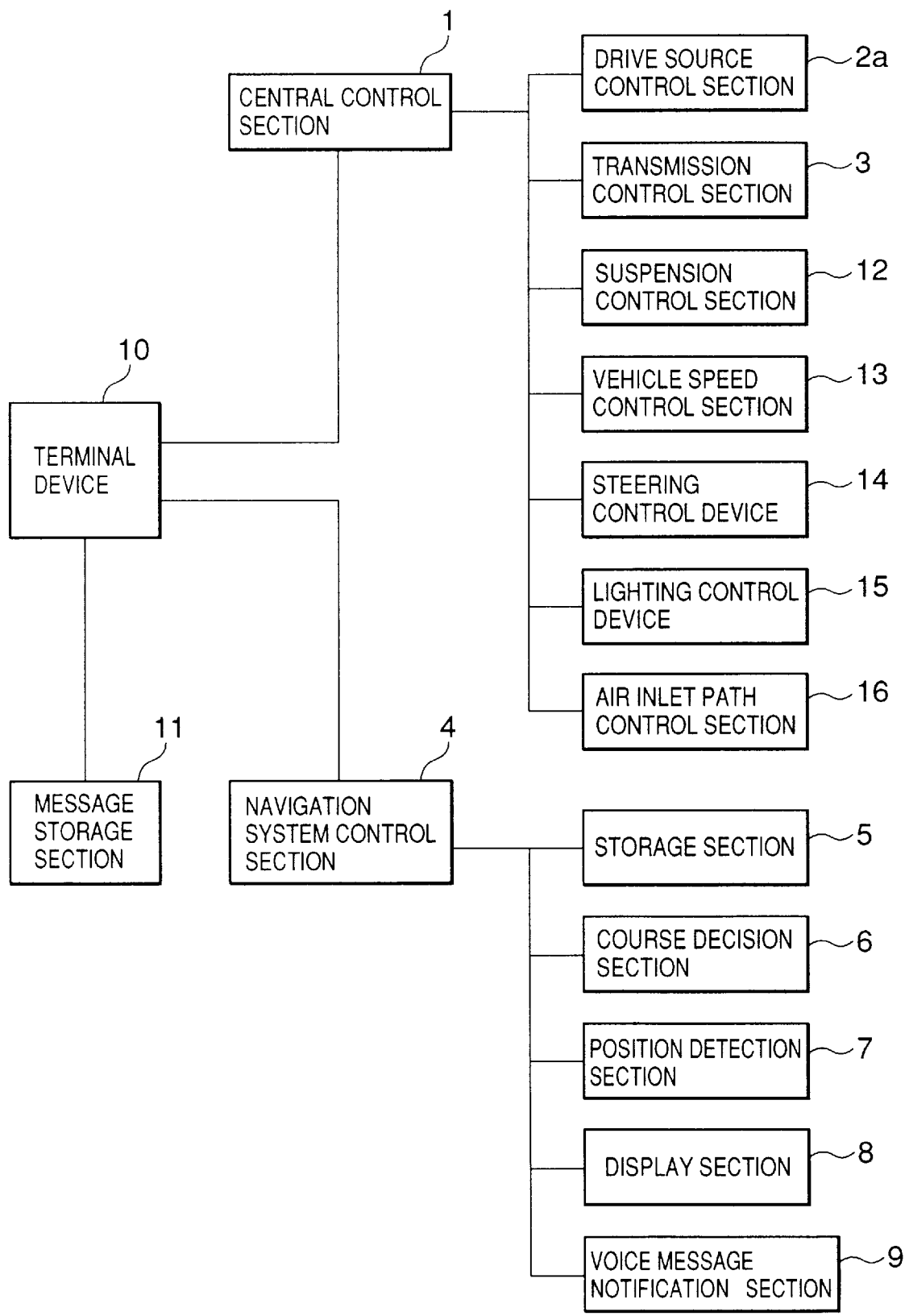
FIG. 10 is a block diagram showing a configuration of a vehicle-mounted travel control system according to a fifth embodiment of the present invention.

FIG. 10 is a block diagram showing a configuration of a vehicle-mounted travel controlling system according to a fifth embodiment of the present invention. Referring to FIG. 10, the same reference numerals as those of FIGS. 8 and 9 indicate the same or equivalent portions. A lighting control device 15 controls a lighting device to turn lights on or off. An air inlet path control section 16 switches an air conditioner from an external air inlet to an internal air circulation, or from internal air circulation to an external air inlet.

The terminal device 10 judges whether a tunnel exists on the intended travel route based on the attribute of the position information of the intended travel position after the lapse of the predetermined time. When it judges the existence of the tunnel on the intended travel position, the terminal device 10 produces light turn-on controlling information such that, for example, the headlights are turned on immediately before going into the tunnel. The time required for moving from the present position to the intended travel position is determined by the present vehicle speed and the distance between the present position and the intended travel position. The time immediately before going into the tunnel is set based on the determined moving time. The central control section 1 instructs the lighting control device 15 based on the light turn-on controlling information transferred from the terminal device 10 to turn on the light immediately before going into the tunnel on the intended travel position.

As described above, according to this embodiment, when it is judged that the tunnel exists at the intended travel position, light turn-on controlling information such that the light is turned on immediately before going into the tunnel is produced, and the light is turned on by the lighting control device 15 based on the produced light turn-on controlling information immediately before going into the tunnel on the intended travel position. Thus, the light can be automatically turned on immediately before going into the tunnel on the intended travel position. For this reason, each manual turn-on of the light when the tunnel is in sight can be eliminated, and the light can be securely turned on without being delayed for moving into the tunnel.

As described in the first embodiment, the terminal device 10 can obtain several pieces of information about the intended travel position at several predetermined times. For example, if a time longer than the predetermined time t1 is given to the navigation system control section 4, ahead course information can be obtained. In this way, the terminal device 10, when it judges that more than one tunnel exists on the intended travel course, produces light ON/OFF-controlling information such that the light is turned on immediately before going into the first tunnel on the intended travel course and the light is turned off immediately after passing through the last tunnel. The central control section 1 instructs the lighting control section 15 based on the light ON/OFF-controlling information transferred from the terminal device 10 to turn on the light immediately before going into the first tunnel on the intended travel course, and to turn off the light immediately after passing through the last tunnel. For example, when the vehicle passes through the second tunnel immediately after passing through the first tunnel, the vehicle speed v1 immediately before passing through the first tunnel and the distance of the second tunnel are calculated. When the OFF/ON timer of the light is within the predetermined time, the light is kept on until the vehicle passes through the second tunnel.

As described above, according to this embodiment, when it is judged that several tunnels exist at several intended travel positions, light ON/OFF-controlling information is produced such that the light is turned on immediately before going into the first tunnel, and turned off immediately after passing through the last tunnel by the lighting control section 15 based on the produced light ON/OFF-controlling information. Thus, the light can be automatically turned on immediately before going into the first tunnel and turned off immediately after passing through the last tunnel. For this reason, frequent turning ON and OFF of the light can be prevented, thereby increasing the life of the light.

Similarly, the terminal device 10 judges whether a tunnel exists on the intended travel course based on the attribute of the position information of the intended travel position after the lapse of the predetermined time. When it judges that the tunnel exists on the intended travel course, the terminal device 10 produces air inlet path-controlling information such that an air conditioner is switched from external air inlet to internal air circulation immediately before going into the tunnel. The central control section 1 instructs based on the information for controlling air inlet path transferred from the terminal device 10 to switch the air conditioner from an external air inlet to internal air circulation.

As described above, according to this embodiment, when it is judged that a tunnel exists on the intended travel position, air inlet path-controlling information is produced such that the air conditioner is switched from obtaining air from an external air inlet to internal air circulation immediately before going into the tunnel, and the air conditioner is switched from external air inlet to internal air circulation immediately before going into the tunnel by the air inlet path control section 16 based on the produced air inlet path-controlling information. Thus, contaminated air in the tunnel can be prevented from entering the vehicle when the vehicle goes into the tunnel. In addition, in the case of successively existing tunnels, it is also possible to avoid frequent switching of the air inlet path of the air conditioner.

Further, a few seconds are commonly required for switching the air inlet path of the air conditioner. However, registration of the switching time in the terminal device 10 can provide timing for switching the air inlet path in consideration of the present vehicle speed v1 and the switching time, whereby the air conditioner can be securely switched to internal air circulation before going into the tunnel.

Similarly, the terminal device 10 judges whether a tunnel exists on the intended travel course based on the attribute of the position information of the intended travel position after the lapse of the predetermined time. When it judges that a tunnel exists on the intended travel course, the terminal device 10 produces suspension-controlling information such that the suspension is controlled immediately before and immediately after the tunnel so as to prepare for side winds generated immediately before and immediately after the tunnel. The central control section 1 instructs the suspension control section 12 based on the suspension-controlling information transferred from the terminal device 10 to control the suspension in preparation for the side winds generated at immediately before and immediately after the tunnel.

As described above, according to this embodiment, when it is judged that a tunnel exists on the intended travel position, suspension-controlling information is produced such that the suspension is controlled so as to prepare for the side winds generated immediately before and immediately after the tunnel, and the suspension is controlled by the suspension control section 12 based on the produced information for controlling the suspension. Thus, the suspension can be controlled, for example, to be rather stiff. For this reason, stable travelling can be obtained even if side winds blow immediately before and immediately after the tunnel. A case is herein described where the suspension is controlled immediately before and immediately after the tunnel. However, the present invention is not limited thereto, and the suspension may be controlled at least either immediately before or immediately after the tunnel.

Similarly, the terminal device 10 judges whether a tunnel exists on the intended travel course based on the position information of the intended travel position after the lapse of the predetermined time. When it judges that a tunnel exists at the intended travel position, the terminal device 10 produces drive source-controlling information such that the drive source of the hybrid-type vehicle is controlled immediately before going into the tunnel. The central control section 1 instructs the drive source control section 2a based on the drive source-controlling information transferred from the terminal device 10 to switch the drive source of the hybrid-type vehicle to the electric motor immediately before going into the tunnel on the intended travel position.

As described above, according to this embodiment, when it is judged that a tunnel exists at the intended travel position, drive source-controlling information is produced such that the drive source of the hybrid-type vehicle is switched to the electric motor immediately before traveling into the tunnel, and the drive source of the hybrid-type vehicle is switched to the electric motor by the drive source control section 2a immediately before going into the tunnel based on the produced drive source-controlling information. Thus, the vehicle can travel into the tunnel with the electric motor driven. For this reason, air within the tunnel can be prevented from being contaminated as opposed to the case where the engine is used to propel the vehicle through the tunnel.

Sixth Embodiment

Figure 11:
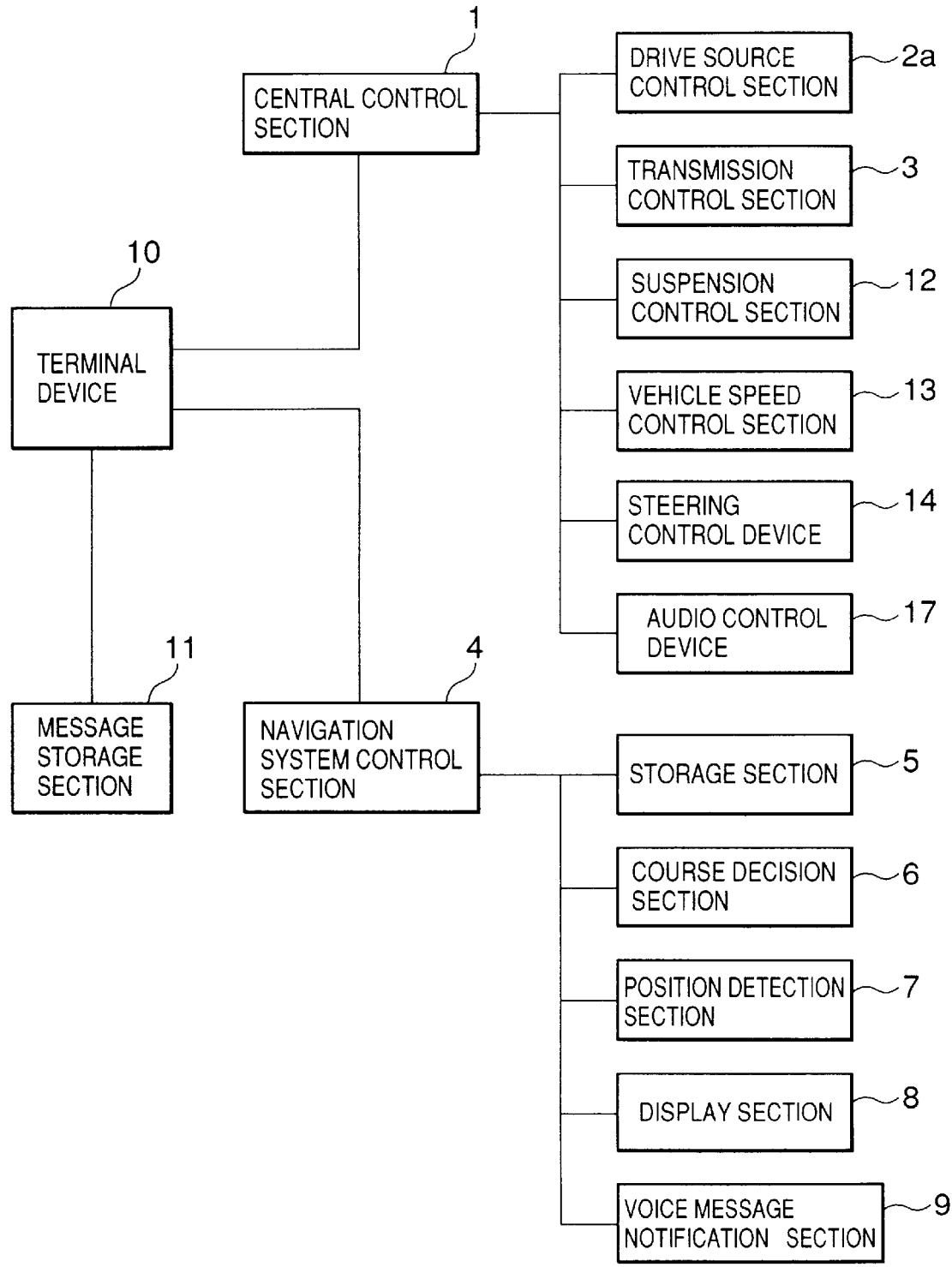
FIG. 11 is a block diagram showing a configuration of a vehicle-mounted travel control system according to a sixth embodiment of the present invention.

FIG. 11 is a block diagram showing a configuration of a vehicle-mounted travel controlling system according to a sixth embodiment of the prevent invention. Referring to FIG. 11, the same reference numerals as those of FIGS. 8 and 9 indicate the same or equivalent portions. An audio control device 17 controls an audio device.

The terminal device 10 judges whether a railroad crossing exists at the intended travel position based on the attribute of the position information of the intended travel position after the lapse of the predetermined time. When it judges that the railroad crossing exists on the intended travel position, the terminal device 10 produces gear-controlling information such that the gear is changed to a low-speed gear immediately before going into the railroad crossing so as to maintain the low-speed gear while passing through the railroad crossing without upshifting the transmission. The central control section 1 instructs the transmission control section 3 based on the gear-controlling information transferred from the terminal device 10 to change the gear to the low-speed gear immediately before going into the railroad crossing so as to maintain the low-speed gear during passing through the railroad crossing without upshifting.

As described above, according to this embodiment, when it is judged that the railroad crossing exists at the intended travel position, gear-controlling information is produced such that the gear is changed to the low-speed gear immediately before going into the railroad crossing so as to maintain the low-speed gear while passing through the railroad crossing without upshifting, and the gear is changed to the low-speed gear by the transmission control section 3 immediately before going into the railroad crossing to maintain the low-speed gear while passing through the railroad crossing without changing up the gear based on the produced gear-controlling information. Thus, the vehicle can pass through the railroad crossing with the low-speed gear. For this reason, driving characteristics at the railroad crossing can be improved.

Similarly, when it is judged that a railroad crossing exists at the intended travel position based on the attribute of the position information of the intended travel position after the lapse of the predetermined time, suspension-controlling information is produced such that the suspension is controlled to increase a vehicle height immediately before going into the railroad crossing. The central control section 1 controls the suspension with the suspension control section 12 for increasing the vehicle height immediately before going into the railroad crossing. Thus, the vehicle can pass through the railroad crossing with the vehicle height increased. For this reason, the bottom of the vehicle can be prevented from striking the ground particularly when passing through a particularly bumpy railroad crossing.

Similarly, the terminal device 10 judges whether a railroad crossing exists at the intended travel position based on the attribute of the position information of the intended travel position after the lapse of the predetermined time. When it judges that the railroad crossing exists at the intended travel position, the terminal device 10 produces volume-controlling information such that the volume of the audio device is turned down immediately before going into the railroad crossing. The central control section 1 instructs the audio control device based on the volume-controlling information to turn down the volume of the audio device immediately before going into the railroad crossing.

As described above, according to this embodiment, when it is judged that the railroad crossing exists on the intended travel position, volume-controlling information is produced such that the volume of the audio device is turned down immediately before going into the railroad crossing, and the volume of the audio device is turned down by the audio control device 17 immediately before going into the railroad crossing based on the produced volume-controlling information. Thus, the vehicle can pass through the railroad crossing with the volume of the audio device turned down. For this reason, the sound of a signal in the railroad crossing can more surely be heard, whereby the vehicle can pass through the railroad crossing with greater safety.

Seventh Embodiment

Figure 12:
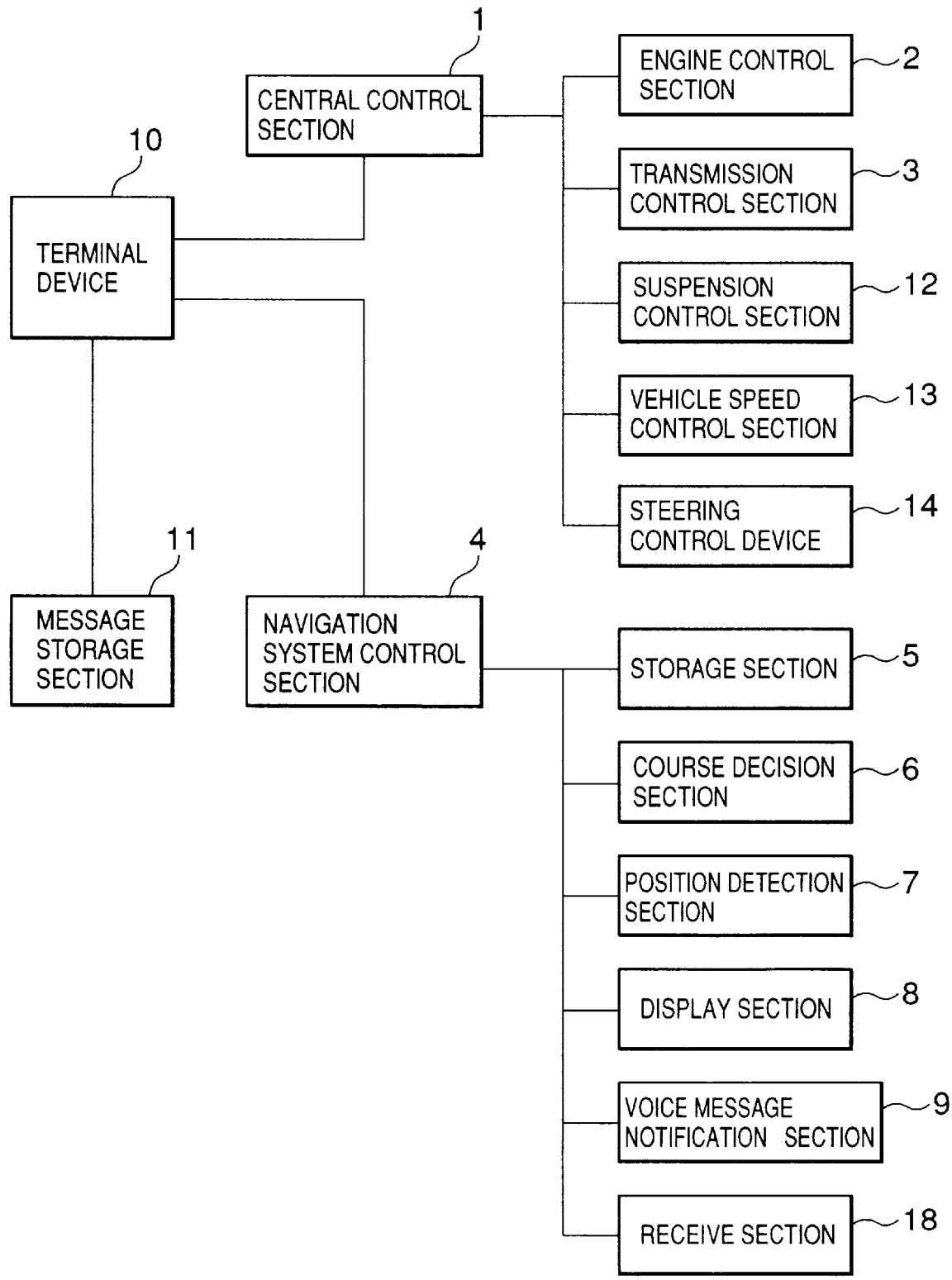
FIG. 12 is a block diagram showing a configuration of a vehicle-mounted travel control system according to a seventh embodiment of the present invention.
Figure 13:
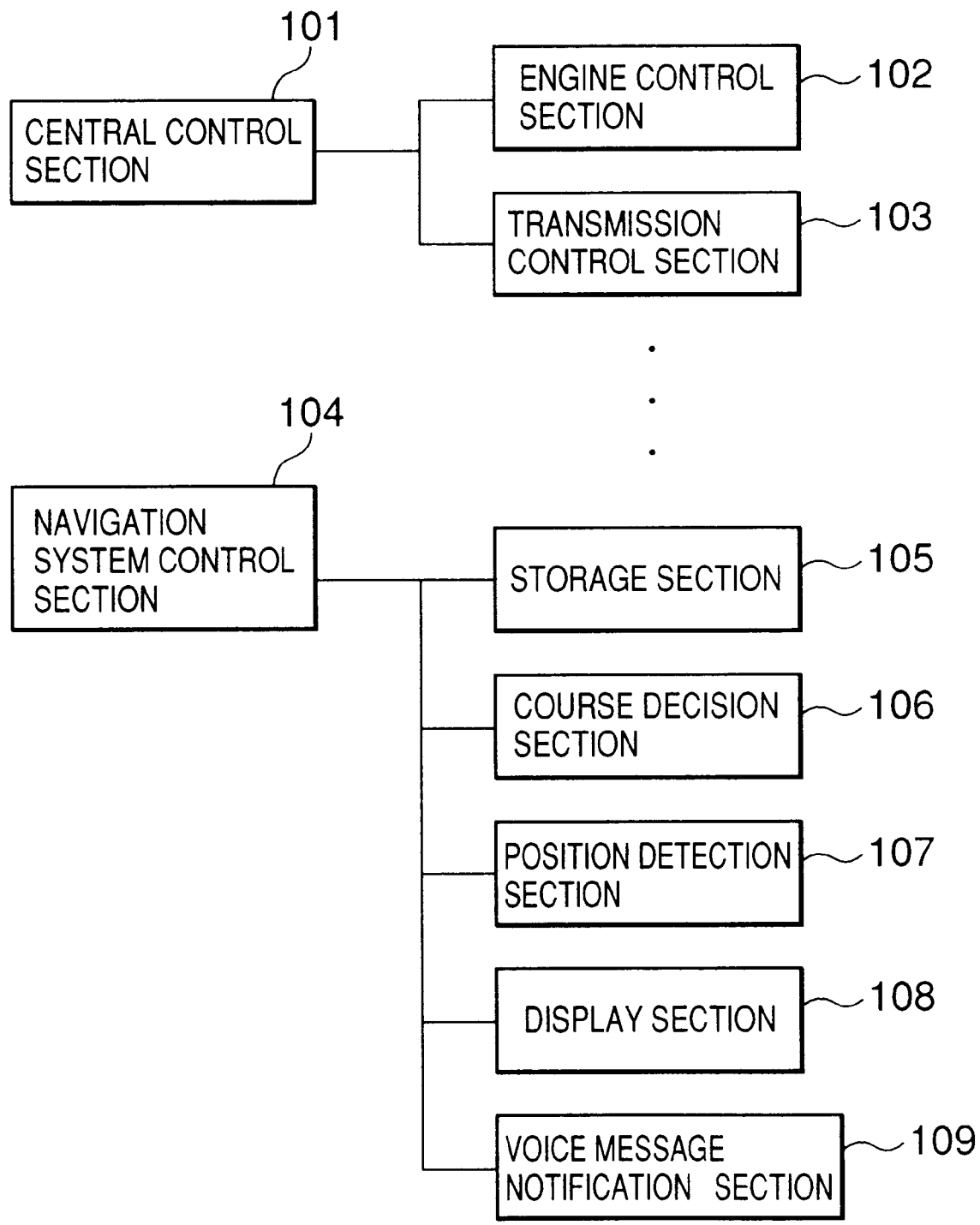
FIG. 13 is a block diagram showing a relationship between a central control section and a navigation control section of a conventional vehicle.

FIG. 12 is a block diagram showing a configuration of a vehicle-mounted travel controlling system according to a seventh embodiment of the present invention. Referring to FIG. 12, the same reference numerals as those of FIGS. 8 indicate the same or equivalent portions. In FIG. 12, receive section 18 receives weather information.

The terminal device 10 extracts weather information corresponding to the position information of the present position and to the position information of the intended travel position after the lapse of the predetermined time based on the weather information which is transferred from the navigation system control section 4 to be received by the receive section 18, and compares the extracted weather information corresponding to the position information of the present position with the extracted weather information corresponding to the position information of the intended travel position to judge whether or not the weather conditions at the intended travel position are different from these of the present position. The terminal device 10, when it judges that the weather condition of the intended travel position is changed with respect to that of the present position, reads alarm information from the message storage section 11 and transfers it to the voice message notification section 9. The voice message notification section 9 provides the alarm information transferred from the terminal device 10 to the driver in the form of a voice message.

As described above, according to this embodiment, the weather information corresponding to the present position and the weather information corresponding to the intended travel position are extracted based on the received weather information, and when it is judged that the weather conditions at the intended travel position are different from the weather conditions at the present position, the alarm information read from the message storage section 11 is notified by the voice message notification section 18. Thus, when the weather conditions at the intended travel position are different from these at the present position, the voice message notification section 9 can inform the matter of the driver. For this reason, the driver can learn the change of the weather conditions at the intended travel position with respect to the weather condition of the present position. For example, when it is clear before the tunnel and snowing beyond the tunnel, it becomes possible to instruct the driver to mount tire chains on the tires.

Next, the terminal device 10 extracts weather information corresponding to the position information of the intended travel position after the lapse of the predetermined time transferred from the navigation system control section 4 based on the weather information received by the receive section 18, and judges whether the extracted weather condition of the intended travel position is snow. The terminal device 10, when it judges that the weather condition of the intended travel position is snow, produces vehicle speed-controlling information such that the vehicle speed is reduced immediately before arriving at the intended travel position. The central control section 1 instructs the vehicle speed control section 13 based on the produced vehicle speed-controlling information to reduce the vehicle speed immediately before arriving at the intended travel position.

As described above, according to this embodiment, the weather information corresponding to the intended travel position is extracted based on the received weather information, and when it is judged that the extracted weather condition of the intended travel position is snow, vehicle speed-controlling information is produced such that the vehicle speed is reduced by the vehicle speed control section 13 immediately before arriving at the intended travel position based on the vehicle speed-controlling information. Thus, the vehicle can reduce speed in advance and then go on to a snowy road when it snows at the intended travel position. For this reason, safety can be improved. For example, when it is judged that the weather condition of the route after passing through the tunnel is snow, the vehicle speed can be reduced before exiting the tunnel to prepare for the snowy road.

Next, the terminal device 10 extracts weather information corresponding to the position information of the intended travel position after the lapse of the predetermined time transferred from the navigation system control section 4 based on the weather information received by the receive section 18, and judges whether the extracted weather condition of the intended travel position is snow. The terminal device 10, when it judges that the weather condition at the intended travel position is snow, produces suspension-controlling information such that the suspension is controlled to increase the vehicle height immediately before arriving at the intended travel position. The central control section 1 instructs the suspension control section 12 based on the produced suspension-controlling information transferred from the terminal device 10 to increase the vehicle height immediately before arriving at the intended travel position.

As described above, according to this embodiment, the weather information corresponding to the intended travel position is extracted based on the received weather information, and when it is judged that the extracted weather condition at the intended travel position is snow, suspension-controlling information is produced such that the suspension is controlled by the suspension control section 12 so as to increase the vehicle height immediately before arriving at the intended travel position based on the produced suspension-controlling information. Thus, the vehicle can increase its height in advance and then go on to a snowy road when it snows at the intended travel position. For this reason, safety can be improved. For example, when it is judged that the weather condition of the course after passing through the tunnel is snow, the vehicle height can be adjusted before going out of the tunnel to prepare for the snowy road.

The foregoing specification describes the invention in terms of several particular embodiments only for the purposes of facilitating understanding of the inventions. The embodiments, however, are merely examples of how the invention may be made, used, or practiced. There are not the only ways the invention may be embodied, however, and other embodiments not explicitly described herein may also incorporate aspects of the invention. The embodiments therefore should not be regarded as limiting the invention, and the invention should instead be regarded as fully commensurate in scope with the following claims.

I claim:

1. A vehicle-mounted travel control system, comprising:
   a navigation system control section which controls a storage section for storing map information inclusive of position information of a vehicle, a position detection section for detecting a present position of the vehicle, a course decision section for deciding an intended travel course of the vehicle, and in which position information of the present position of the vehicle is calculated by superimposing the position information detected by said position detection section onto the map information read out from said storage section;
   a central control section for managing at least one subsystem control section based on information from a plurality of sensors installed in the vehicle, at least one of said sensors sensing an actual vehicle speed; and
   a terminal device which is connected to said navigation system control section and said central control section, and which processes information from both of said navigation system control section and said central control section and transfers information to said navigation system control section and said central control section,
   wherein said terminal device determines at least one predetermined time responsive to the actual vehicle speed based on actual vehicle speed information transferred from said central control section, and
   wherein said navigation system control section determines an intended travel position where the vehicle will be after the lapse of the predetermined time based on the actual vehicle speed and the predetermined time transferred from said terminal device, and virtually advances a virtual position of the vehicle in a memory to the determined intended travel position.

2. A vehicle-mounted travel control system according to claim 1, wherein said terminal device is adapted to judge that the actual vehicle speed is zero, and so that the vehicle has stopped, to set a provisional vehicle speed when it is judged that the vehicle has stopped, and to determine the predetermined time responsive to said set provisional vehicle speed.

3. A vehicle-mounted travel control system according to claim 1, wherein said navigation system control section is adapted to read out vehicle position information corresponding to said intended travel position from said storage section and to transfer said position information to said terminal device.

4. A vehicle-mounted travel control system according to claim 1, wherein said terminal device is adapted to judge whether a tunnel exists at the intended travel position based on the attribute of the position information of the intended travel position after said predetermined time has elapsed; and to produce control information to said at least one control section immediately before going into the tunnel at the intended travel position when it is judged that a tunnel exists at the intended travel position.

5. A vehicle-mounted travel control system according to claim 1, wherein said terminal device is adapted to judge whether a railroad crossing exists at the intended travel position based on the attribute of the position information of the intended travel position and to produce control information to at least one of controlling devices mounted on said vehicle immediately before going into the railroad crossing of the intended travel position when it is judged that the tunnel exists on the intended travel position.

6. A vehicle-mounted travel control system according to claim 1, wherein said navigation system control section is provide with a voice message notification section for providing a voice message, and a receive section for receiving weather information, wherein said terminal device is adapted to extract weather information corresponding to the position information of the present position and to the position information of the intended travel position based on the weather information received by said receive section, and to compare the extracted weather information corresponding to the present position with the extracted weather information corresponding to the intended travel position to judge whether the weather condition of the intended travel position is different from the weather condition of the present position; and to read out the alarm information and to transfer the alarm information to said voice message notification section when it is judged that the weather condition of the intended travel position is different from the weather condition of the present position, and wherein said voice message notification section provides a driver with a voice message advising the driver of the alarm information transferred from said terminal device.

7. A vehicle-mounted travel control system according to claim 1, wherein said terminal device is adapted to extract weather information corresponding to the position information of the intended travel position transferred from said navigation system control section based on the weather information received by said receive section, and to judge whether the weather condition of the intended travel position is snow; and to produce control information to at least one of said first control section and said second control section.

8. A control method for controlling operating systems of a vehicle having a vehicle-mounted travel control system, the travel control system including a navigation system control section which controls a storage section, a position detection section for detecting a present position of the vehicle, and a course decision section for deciding an intended travel course of the vehicle, and also including a central control section for managing at least one subsystem control section based on information from various sensors installed in the vehicle, at least one of the sensors sensing actual vehicle speed information; and also including a terminal device which is connected to said navigation system control section and said central control section, and which processes information from both said navigation system control section and said central control section and transfers the information to said navigation system control section and said central control section, said method comprising the steps of:

determining at least one predetermined time responsive to an actual vehicle speed based on the actual vehicle speed information transferred from said central control section, determining an intended travel position, where the vehicle is expected to be after the predetermined time has elapsed, with reference to the present position of the vehicle based on the actual vehicle speed and predetermined time transferred from said terminal device, and virtually advancing a virtual position of the vehicle in a memory to the determined intended travel position.

9. A method according to claim 8, further comprising the steps of judging that the actual vehicle speed is zero and so that the vehicle has stopped, setting a provisional vehicle speed when it is judged that the vehicle is stopping, and carrying out said step of determining said predetermined time based on said set provisional vehicle speed rather than said actual vehicle speed.

10. A method according to claim 8, further comprising a step of judging whether a tunnel exists at the intended travel position based on an associated attribute of the position information of the intended travel position, and a step of producing control information to said at least one of subsystem control section immediately before going into the tunnel at the intended travel position when it is judged that the tunnel exists at the intended travel position.

11. A method of according to claim 8, further comprising a step of judging whether a railroad crossing exists at the intended travel position based on an associated attribute of the position information of the intended travel position, and a step of producing control information to said at least one of subsystem control section immediately before going into the railroad crossing of the intended travel position when it is judged that a tunnel exists at the intended travel position.

12. A vehicle-mounted travel control system, comprising:

a storage storing map information, said map information including first information concerning a road for a vehicle and second information concerning a root landmark; and a terminal device for determining an intended travel position at which said vehicle is expected to exist when said vehicle travels from a present position for a predetermined time, and for producing control information for controlling said vehicle based on said second information and said intended travel position before said vehicle arrives at said intended position, wherein said root landmark is a tunnel, and said terminal device produces said control information when said tunnel exists at said intended position.

13. A vehicle-mounted travel control system according to claim 12, further comprising a lighting device which is controlled based on said control information.

14. A vehicle-mounted travel control system according to claim 12, further comprising an air inlet path control section for switching an air conditioner from an external air inlet to an internal air circulation, or from the internal air circulation to the external air inlet based on said control information.

15. A vehicle-mounted travel control system, comprising:
- a storage storing map information, said map information including first information concerning a road for a vehicle and second information concerning a root landmark; and
- a terminal device for determining an intended travel position at which said vehicle is expected to exist when said vehicle travels from a present position for a predetermined time, and for producing control information for controlling said vehicle based on said second information and said intended travel position before said vehicle arrives at said intended position,
- wherein said root landmark is a railroad crossing, and said terminal device produces said control information when said railroad crossing exists at said intended position.

16. A vehicle-mounted travel control system according to claim 15, further comprising an audio control device for controlling volume of an audio device.

17. A vehicle-mounted travel control system, comprising:
- a storage storing map information, said map information including weather information; and
- a terminal device for determining an intended travel position at which said vehicle is expected to exist when said vehicle travels from a present position for a predetermined time, and for producing control information based on said weather information and said intended travel position before said vehicle arrives at said intended position.

18. A vehicle-mounted travel control system according to claim 17, further comprising a voice message notification section for providing alarm information, said alarm information being produced before said vehicle arrives at said intended position.

* * * * *